United States Patent
Yim et al.

(10) Patent No.: US 6,575,802 B2
(45) Date of Patent: *Jun. 10, 2003

(54) ROBOTIC TOY MODULAR SYSTEM WITH DISTRIBUTED PROGRAM

(75) Inventors: Mark H. Yim, Palo Alto, CA (US); Samuel B. Homans, Oakland, CA (US); David G. Duff, Woodside, CA (US); Kimon D. Roufas, Mountain View, CA (US); John W. Suh, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/939,186

(22) Filed: Aug. 24, 2001

(65) Prior Publication Data

US 2003/0040249 A1 Feb. 27, 2003

(51) Int. Cl.$^7$ ................................. A63H 33/04
(52) U.S. Cl. ........................ 446/91; 446/484; 901/1
(58) Field of Search ................... 446/91, 102, 175, 446/297, 299, 477, 484; 901/1, 50, 28, 9, 15; 74/479.01; 414/915

(56) References Cited

U.S. PATENT DOCUMENTS

| | | | | |
|---|---|---|---|---|
| 5,241,875 A | * | 9/1993 | Kochanneck | 74/490.03 |
| 5,779,515 A | * | 7/1998 | Chung | 446/90 |
| 6,206,745 B1 | | 3/2001 | Gabai et al. | 446/91 |
| 6,454,624 B1 | * | 9/2002 | Duff et al. | 446/91 |

FOREIGN PATENT DOCUMENTS

| EP | 0 923 011 A2 | 6/1999 |
|---|---|---|
| WO | WO 00/45924 | 10/2000 |
| WO | WO 00/45925 | 10/2000 |

* cited by examiner

Primary Examiner—Jacob K. Ackun
(74) Attorney, Agent, or Firm—Linda M. Ross (57) ABSTRACT

An assemblage of robotic modules for a toy construction system includes a plurality of robotic modules, each of which contains memory capability, an actuator, communication means, and a central processor unit. The assemblage also includes a distributed control unit, which is defined at least in part by a plurality of individual central processing units, with each individual robotic module having at least one central processing unit.

9 Claims, 7 Drawing Sheets

ROBOTIC TOY MODULAR SYSTEM WITH DISTRIBUTED PROGRAM

This work was funded in part by the Defense Advanced Research Projects Agency (DARPA), Contract #MDA972-98-C-0009. The U.S. Government may have certain rights in this invention.

CROSS REFERENCE TO RELATED APPLICATIONS

The following co-pending applications, Attorney Docket Number D/A1522, U.S. application Ser. No. 09/939,368, filed Aug. 24, 2001, titled "Robotic Toy Modular System", and Attorney Docket Number D/A1523, U.S. application Ser. No. 09/938,924, now U.S. Pat. No. 6,454,624, filed Aug, 24, 2001, titled "Robotic Toy with Posable Joints, are assigned to the same assignee of the present application. The entire disclosures of these co-pending applications are totally incorporated herein by reference in their entirety.

INCORPORATION BY REFERENCE

The following patent is fully incorporated herein by reference: U.S. Pat. No. 6,206,745 B1 to Gabai et al. ("Programmable Assembly Toy").

BACKGROUND OF THE INVENTION

This present invention relates generally to reconfigurable modular robotic systems, and more particularly this invention relates to microprocessor controlled robotic modules for a robotic toy construction system.

Modular robotic systems are those systems that are composed of modules which can be disconnected and reconnected in various arrangements to form a new system enabling new functionalities. This results in multiple possible robot structures for the same number of robotic modules. The user interconnects a certain number of modules to form a desired system based on the task to be accomplished by the system. Such systems tend to be more homogeneous than heterogeneous. That is, the system may have different types of modules, but the ratio of the number of module types to the total number of modules is low. In typical systems, one or more mechanisms, such as robotic arms, or manipulators, may be connected to a control system, which controls the motion and actions in accordance with a task specification and program. The motions may include point-to-point motion, or trajectory tracking motion. Actions may include end-effector control or interfacing to other systems such as tools and machines.

The controller for traditional robotic systems is a centralized unit which is connected to the robotic system through a multi-conductor cable system. Therefore, a system assembled from such modules is modular only in a limited mechanical sense, and its reconfigurability is limited. Because the control system electronics are centralized, the modules cannot be considered as intelligent single units, since they lack dedicated control processors and associated software.

Robotic systems have also found applications within the toy industry. Toy development has proceeded from simple functions such as the playing of sounds in dolls, performance of simple patterns of movement in robots, to the development of robotic toys with sophisticated patterns of action and a form of behavior.

Toy building elements may perform different physical actions partially through programming the building element and partially by building a structure which consists of interconnected toy building elements of various types. Through a variety in types of building elements, there are numerous possibilities for forming structures and giving the structures various functions. The physical actions of the structures may comprise simple or relatively complex movements controlled by an electric motor or may include the emission of light or sounds. The toy's physical actions may be conditioned by the interaction of the toy with its surroundings, and the toy may be programmed to respond to physical contact with an object or to light, or possibly sound, and to change its behavior on the basis of the interaction. Such programmable toys are programmed by a central processing unit to make unconditioned as well as conditioned responses.

However, these toys require an external central processing unit programming the elements and directing its movement and also a variety of types of building elements. The object of this invention is to provide a modular robotic toy construction system having active modules, each with its own micro-controller, actuators, input and output devices with the program controlling the actuators distributed among the modules. This facilitates control of the system. Coordination between modules may occur through a single initialization pulse or by network communication between attached modules.

The following patents illustrate existing modular robotic elements or toys:

European Patent Application No. EP 0 923 011 A2 to Fujita et al., titled "Robot Systems and Robot Drive-controlling Methods", teaches a robot system having multiple modules connected to a central processing unit (CPU) which controls overall operation of the assembled robot. The CPU is located in a body unit which also houses a serial bus host, a distributor, random access memory (RAM) and read only memory (ROM) in which is stored a program for making the assembled robot generate a variety of actions. Additional component units are connected to the body unit or to each other and communicate with the body unit through a serial bus. Each component unit includes electronic parts, a connection hub, and memory in which is stored motion information and the characteristic information of the electronic parts of the component unit.

International Patent Application No. WO 00/45924 to Munch et al., titled "A Microprocessor Controlled Toy Building Element with Visual Programming", discloses a programmable toy having a microprocessor which can execute instructions in the form of a program stored in memory. The microprocessor is adapted to control electrical and electromechanical units. A display, integrated with the toy, contains icons, each of which represents instructions for the microprocessor, and which can be activated by a user for programming of the microprocessor through a visual user interface.

International Patent No. WO 00/45925 to Munch et al., titled "A Programmable Toy with Communication Means", which teaches a microprocessor controlled toy building element which may be coupled to other building elements. For example, it may be coupled to a separate structure having a motor and wheels to form a motorized toy vehicle. Each microprocessor executes instructions stored in a memory, which contains subprograms which may be activated individually by specifying a list of subprogram calls. The toy has a transmitter for communicating instructions to a second toy.

U.S. Pat. No. 6,206,745 B1 to Gabai et al., titled "Programmable Assembly Toy", teaches a programmable assembly toy including both controllable and non-controllable toy elements. The non-controllable elements may be joined to define a structure. The controllable toy elements may interact with the structure and are controlled by a computer control system. The computer control system may be a personal computer equipped with a screen, sound card, hard disk and optionally a CD-ROM drive. A computer radio interface transmits signals via wireless transmission to the controllable toy elements, each of which has a power source, a toy control device, and input and output devices.

SUMMARY OF THE INVENTION

Briefly stated, and in accordance with one aspect of the instant invention, there is provided an assemblage of robotic modules for a toy construction system. The assemblage includes a plurality of robotic modules, with each robotic module having memory capability, an actuator, communications means, and a central processing unit. The assemblage of robotic modules also includes a distributed control unit, which includes a plurality of individual central processing units, with each robotic module containing at least one individual central processing unit.

In another aspect of the instant invention, there is disclosed a method for controlling an assemblage of robotic modules for a toy construction system. Each robotic module includes memory capability, an actuator, communication means, and a central processing unit. The method for controlling the assemblage of robotic modules includes distributing a sequence of behaviors for the assemblage of robotic modules among the robotic modules. The sequence of behaviors is stored within the individual central processing units of each of the robotic modules.

In yet another aspect of the invention, there is disclosed a method for downloading a control program to an assemblage of robotic modules for a toy construction system. Each robotic module includes memory capability, an actuator, communication means, and a central processing unit. The control program is communicated to all of the robotic modules simultaneously. Each robotic module determines which elements of the control program are relevant for its individual control.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Toy construction systems which contain robotic elements are designed to be used to be assembled into a single robot controlled by a central processing unit (CPU) which controls one or several motors, sensors, or other electronic components. While it may be possible to link more than one CPU together, this would require considerable sophistication and effort and could be accomplished only by advanced users. This invention is a toy construction system that consists of active modules, each of which integrates a micro-controller or CPU with components such as actuators, input devices, and output devices, with the program controlling the actuators distributed among the modules, thus facilitating control of the system. A system would typically contain multiple copies of each module, repeated as many times as is necessary to achieve a desired structure. These modules are easily connected to each other by their integrated mechanical and/or electrical connections and are automatically networked together. The system functions as a single connected robot whose behavior may be programmed by various means, rather than as a group of separate modules. Coordination between modules may occur through a single initialization pulse or by network communication between attached modules.

Figure 1:
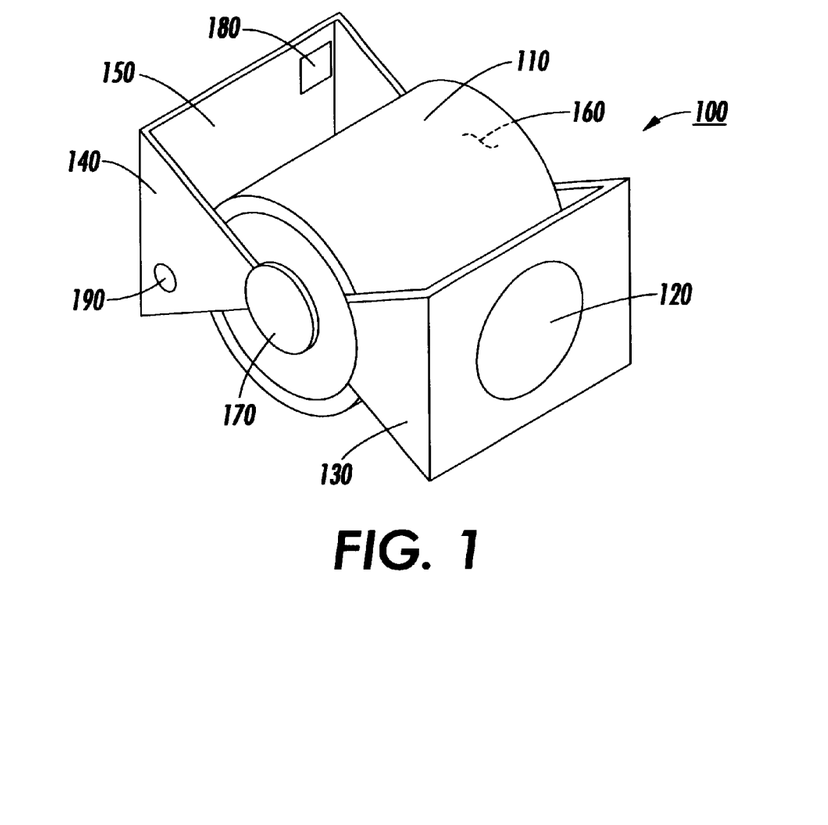
FIG. 1 is a perspective view of one embodiment of a modular element according to the present invention.

Referring to FIG. 1, there is illustrated one embodiment of the robotic modules 100 of the present invention. Each module is identical, having a CPU 180, an actuator 110, sensors 190, and multiple connection ports 120, 150, 160 and 170 integrated into a single unit. Supporting structures 130 and 140 house the connection ports, sensors, and CPU. Supporting structure 140 is connected to the output shaft of motor 110 and may be connected electrically and mechanically to other modules through connection port 150. The remaining connection plates 120, 160, and 170 may function solely as mechanical connection points to other robotic modules 100 or may provide both electrical and mechanical connection points to other robotic modules 100. Connection plates 120, 150, 160 and 170 may advantageously have the same type of connector to permit the interconnection of many module types through any of the connection plates, which permits the assembly of various types of structures. The connectors may also include internal symmetries such that two connection plates may be attached together in multiple ways, for example, two square shaped connectors could be attached together in one of four positions rotated at 90 degree intervals from each other.

Supporting structures 130 and 140 may be made by methods and materials such as injection molded plastics or by formed metal or other rigid or flexible materials. Alternatively, supporting structures 130 and 140 may be formed and connected together to have more than one degree of freedom or the modules may be constructed of links that are attached together in series or in a parallel structure. The actuator 110 may be an electric DC motor with plastic gearing, or other rotational motors such as AC, brushless, harmonic, or a motor with backdrivable gearing or non-backdrivable gearing with a torque limiting clutch between the actuator and the structure. The actuator gearing may be low cost plastic, metal, or a combination of the two and may consist of one or more types of gear stages such as worm and wormgear, spur gear, planetary, or harmonic gears. Low speed, high torque actuators such as ultrasonic motors or piezoelectric motors may also be used. Although FIG. 1 illustrates a single actuator contained within the module, it will be understood that more than one actuator may be present within each module. The CPU 180 may be a 4 bit microcontroller or other 8 bit or higher microcontroller.

For the purpose herein, the module is described as having a motor and supporting structures holding a CPU and connection plates. However, it will be appreciated that the module may take any of numerous shapes and configurations, such as those described in related co-filed application U.S. Ser. No. 09/939,368 "Robotic Toy Modular System" to Yim et al. referenced above.

Figure 2:
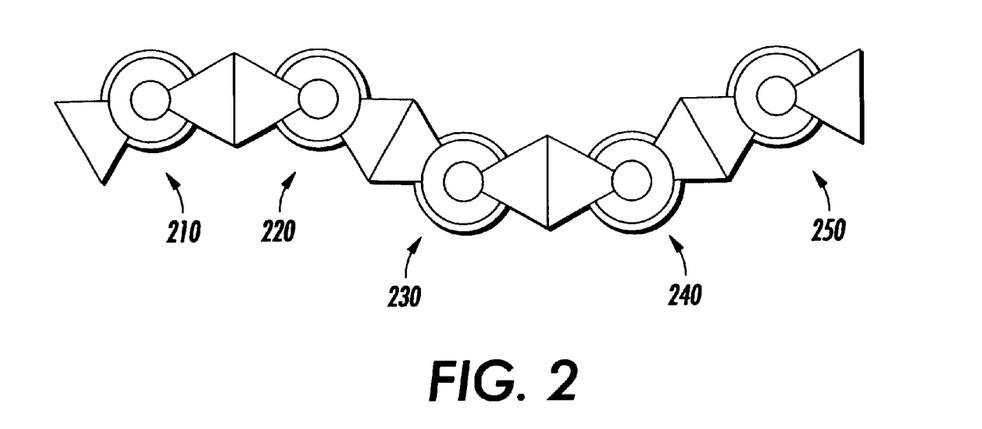
FIG. 2 illustrates one possible configuration for a plurality of the modular elements of FIG. 1.

Referring now to FIG. 2, there is shown an embodiment of one of the many shapes it is possible to achieve by connecting the modules of FIG. 1. In this embodiment, modules 210, 220, 230, 240 and 250 are connected end-to-end to form a linear shape, which may flex and move in a snake-like motion.

Figure 3:
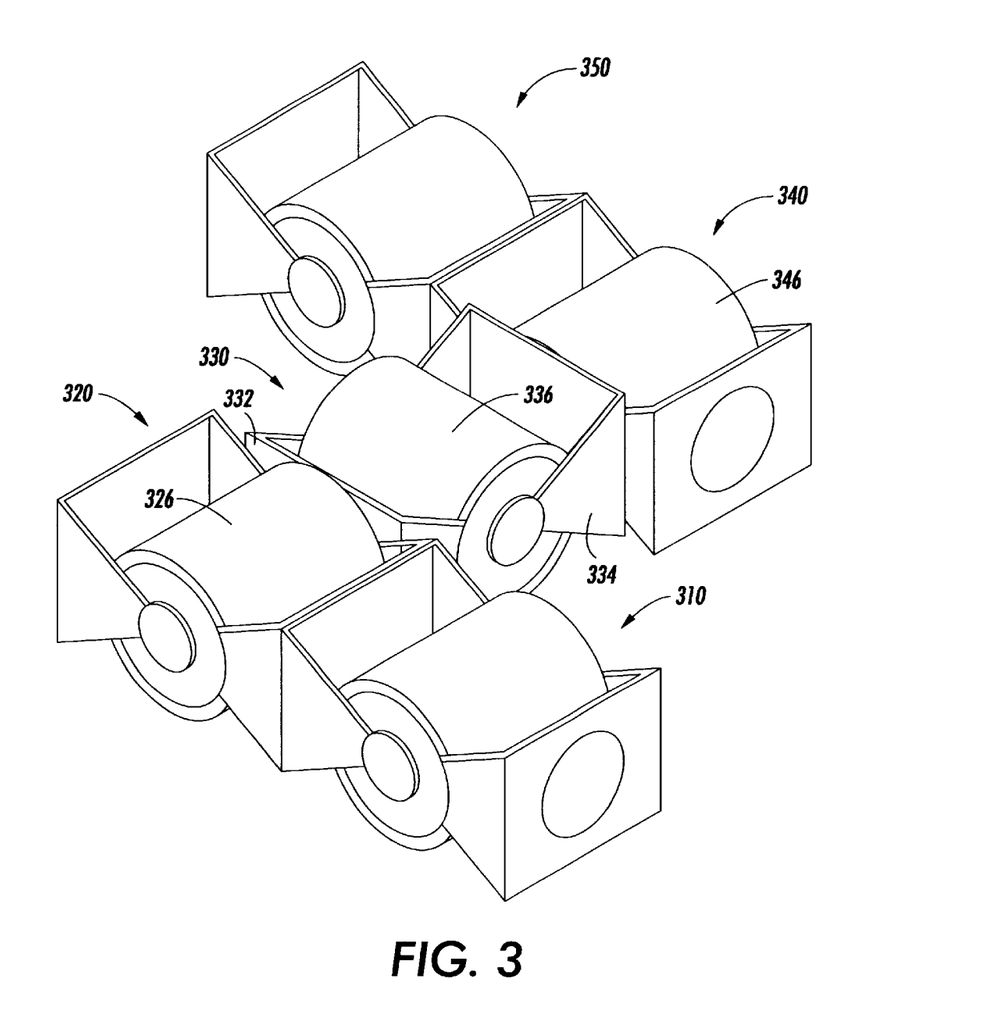
FIG. 3 illustrates another possible configuration for a plurality of the modular elements of FIG. 1.

FIG. 3 illustrates another possible configuration, in which five modules 310,320,330,340 and 350 are connected such that central module 330 connects two pairs of modules. The first pair of modules, 310 and 320, extends from one support structure 332 of module 330, while the second pair of modules, 340 and 350, extend from a second support structure 334 of module 330. In this embodiment, modules 320 and 340 may move rotationally about an axis extending through the center of actuator 336 of module 330. Module 310 may move rotationally about an axis extending through the center of actuator 326 of module 320; module 350 may move rotationally about an axis extending through the center of actuator 346 of module 340.

Figure 4:
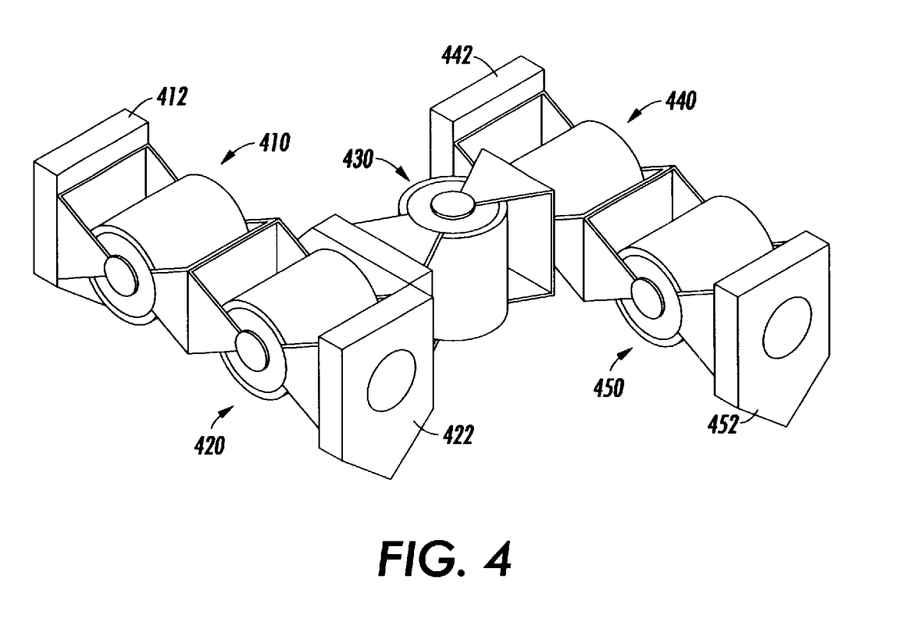
FIG. 4 illustrates another possible configuration for a plurality of the modular elements of FIG. 1.

FIG. 4 is similar to FIG. 3 except that the central module is rotated 90 degrees. This illustrates the use of a connection plate having symmetries that allow different ways to attach modules. In FIG. 4, passive components 412, 422, 442 and 452 are attached to the ends of modules 410, 420, 440 and 450 respectively. In this embodiment the passive components allow the modules to which they are attached to function as feet and modules 410, 420, 440 and 450 to function as legs. Rotation of module 430 allows the translation of the legs; rotation of the leg modules allows the feet to be lifted from the ground. Other types of passive components permitting other functionalities could also be attached to the modules.

FIGS. 2–4 illustrate only three of many configurations which it is possible to construct using the modules described herein in any number and connection pattern. One skilled in the art will readily appreciate that with a sufficient number of modules and various types of passive components, the potential number of configurations is almost limitless.

Figure 5:
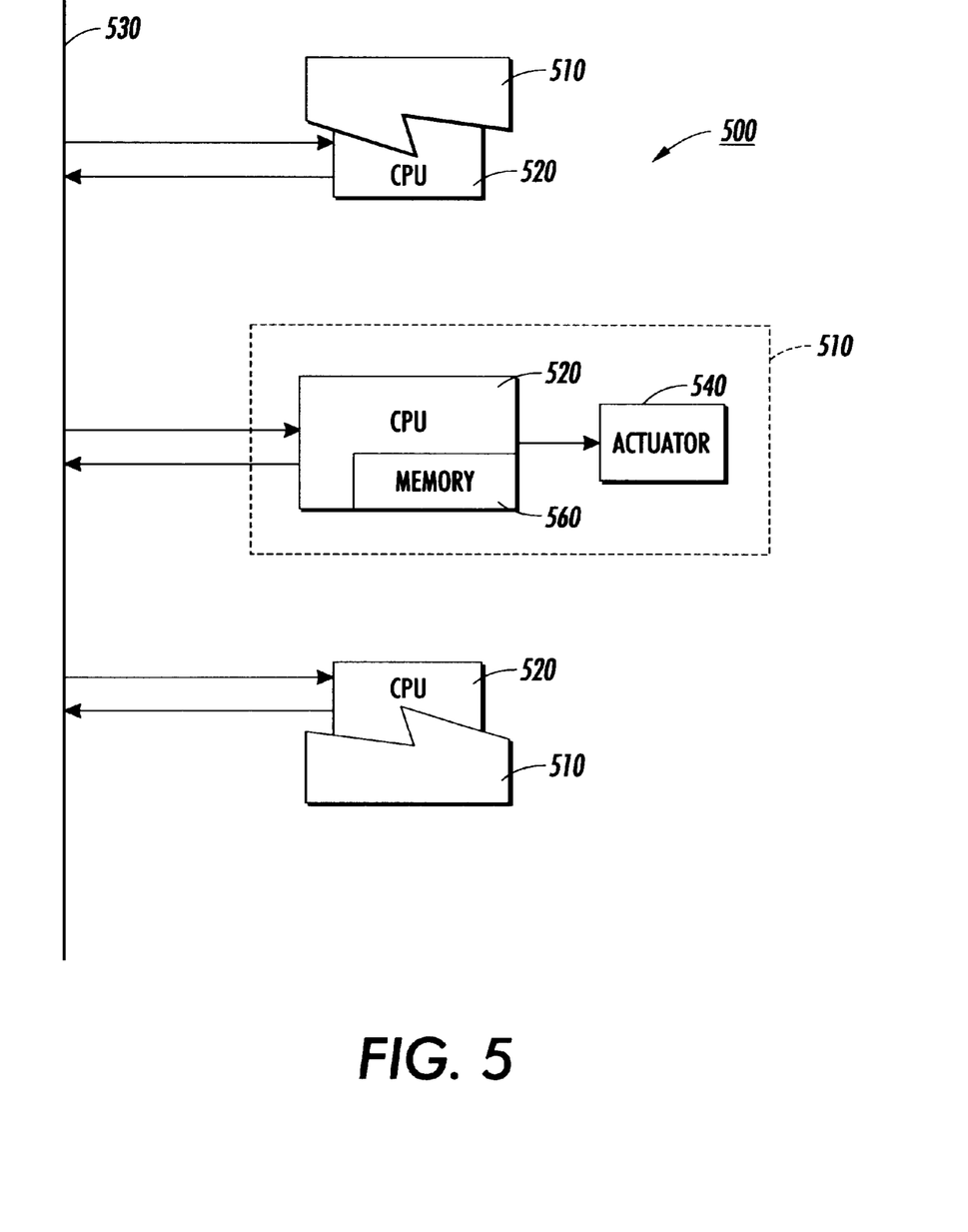
FIG. 5 is a block diagram of one embodiment of the system according to the present invention.

Referring now to FIG. 5, there is shown a block diagram of an embodiment of the system disclosed herein. The basic system 500 includes a plurality of modules 510, all of which contain a CPU 520. For the purposes of clarity, the details of the configuration of this embodiment are shown on the central module only. Each module also includes memory capability 560 which may be integrated on the CPU chip, or which may be on a separate chip connected to the CPU through a printed circuit board or other such means. Each module also includes an actuator 540, for example a DC motor. CPUs 520 communicate with each other through communications bus 530, which connects to each module. The communications bus may be a wired bus, which physically connects to each CPU on each module, and provides either serial or parallel communication capability. Alternatively, communications bus 530 may be wireless, for example local radio frequency transmission or a light based system such as infrared.

Figure 6:
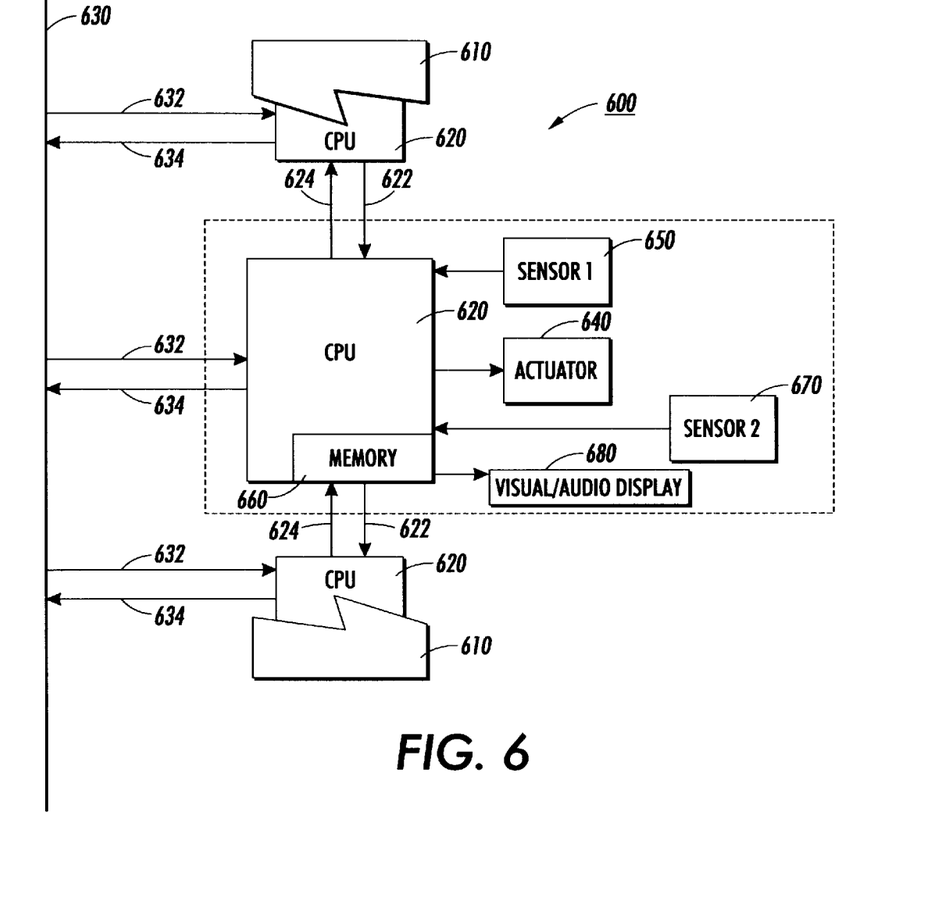
FIG. 6 is a block diagram of another embodiment of the system according to the present invention.

Referring now to FIG. 6, there is shown a block diagram of an alternate embodiment of the system disclosed herein. This embodiment includes multiple modules 610, each having CPUs 620. For the purposes of clarity, the details of the configuration of this embodiment are shown on the central module only, however, this configuration embodiment may be present in some or all of the interconnected modules of the system. The module of this embodiment includes memory 660 and power unit 640, as in the basic system described above. This embodiment also features a visual/audio display 680, which provides the capability for feedback to the user. For example, the display may show the state of the system: the power level, on/off status, or sensing configuration. Alternatively the system may show a display to support a metaphor for the system, such as a happy face or a sad face to indicate the simulated emotions of the device.

Sensors 650 and 670 may be any of various known types, including position sensors, which inform the system as to the angle at which the modular robotic joint is positioned. If the user manually moves the joints the system may then sense the position of the joints. The sensors may also include a light sensor, for detecting the level of light on the modular robotic system, thus assisting the modular robotic system in proceeding toward or away from light. A light sensor could also assist in causing the modular robotic system to behave in a manner appropriate for a desired metaphor, for example going to sleep or inactivating when it is dark, or waking up and activating when it is exposed to light.

Figure 7:
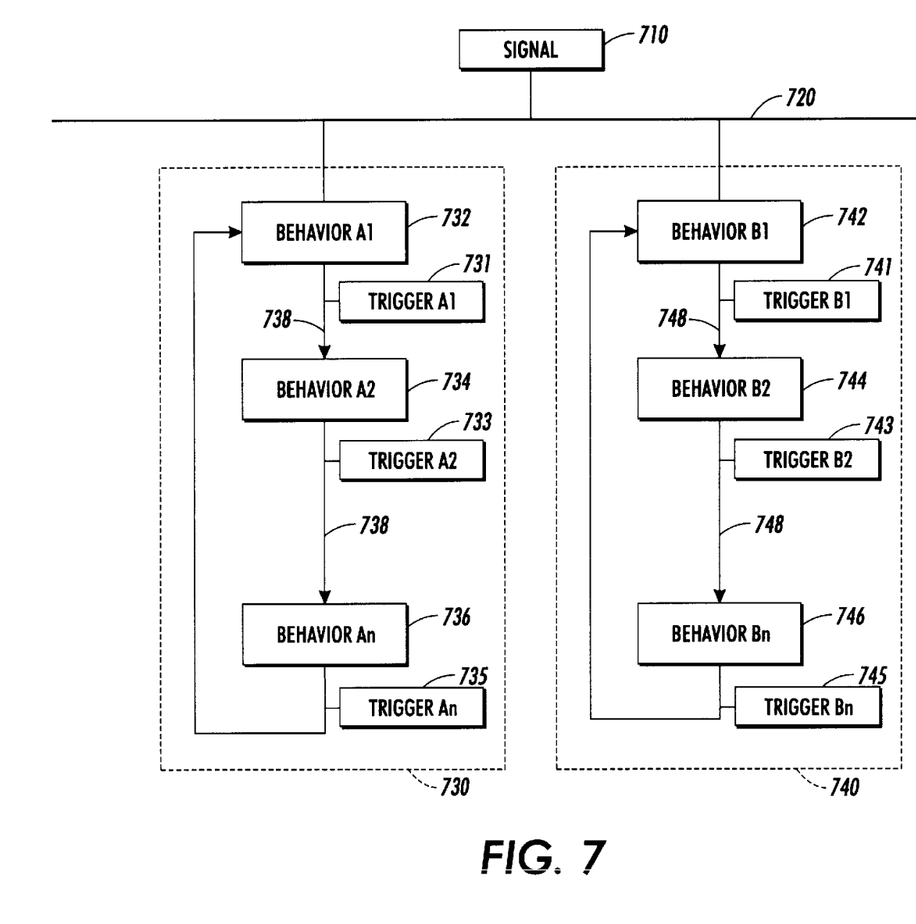
FIG. 7 is a flow chart for the embodiment of the system according to FIG. 5.

Referring now to FIG. 7, there is shown a flow chart for the operation of the system according to the embodiment of the system of the block diagram according to FIGS. 5 or 6. In this embodiment, signal 710 acts as an initiation and synchronization signal. It is transmitted through communication bus 720 to the various modules of the system. Although there is no fixed number of modules, for clarity and simplicity, only two modules are shown in FIG. 7. Although in this embodiment signal 710 is being sent to the modules through communications bus 720, other means, which would be apparent to one skilled in the art, may be employed to provide a signal to the modules. For example the modules may be powered by the same power source, so applying power to all the modules may act as a signal.

The signal is received by module 730 and a first Behavior A1 is initiated at step 732. At the same time, module 740 receives the same signal and a first Behavior B1 is initiated at step 742. After receipt of a first Trigger A1 at step 731, first Behavior A1 is stopped and a second Behavior A2 is initiated at step 734. Similarly, after receipt of a first Trigger B1 at step 741, first Behavior B1 is stopped and a second Behavior B2 is initiated at step 744. The trigger may be an internal state change, such as a specified amount of time either fixed for each behavior or varied for each behavior. Another possible internal state change, which could act as a trigger, may be a specific position of the motor for the individual module. Alternatively, the trigger could be an external state change, such as a sensor value indicating behavior change as a result of an action from the environment. When the last behavior in the list has been stopped due to its trigger, the flow restarts at the top with Behavior A1. It can be appreciated that the module 740 and other subsequent modules act in a similar manner with their respective triggers and behaviors One example of the flow chart of FIG. 7 is a gait control table, or the synchronized motion of a series of modules attached together. In this case, the behaviors may be specified by a series of joint angles. Behavior A1, step 732, may be to move its actuator at a constant speed until it reaches an angle of 45 degrees. The Trigger A1 at step 731 would be the time it takes to reach 45 degrees. Behavior A2 at step 734 may be to move from there until it reaches an angle of 90 degrees. If this were the last behavior, then after reaching 90 degrees the flow would return to the first behavior and the module would move its joint to 45 degrees. Thus module 730 would oscillate back and forth between 45 and 90 degrees. At the same time module 740 may be controlled to move through a different set of angles. As one skilled in the art may appreciate, the combination of many of these modules and motions may result in a gait pattern for locomotion.

Other types of behaviors may be obtained, based on signals from sensors. In this case the flow chart of FIG. 7 also represents the operation of the system according to the embodiment of the system of the block diagram according to FIG. 6, which includes sensors. For example, a force sensor would sense the applied force on a robotic module, to which a possible behavior may be to move away from the force or to be compliant, like a spring. The trigger to halt this behavior may be elapsed time for the behavior, for example after one second the module changes to the next behavior. Triggers may also be based on sensors. In the case of a walking gait, a trigger may sense when the system collides with another object and then signal to change to another behavior.

Figure 8:
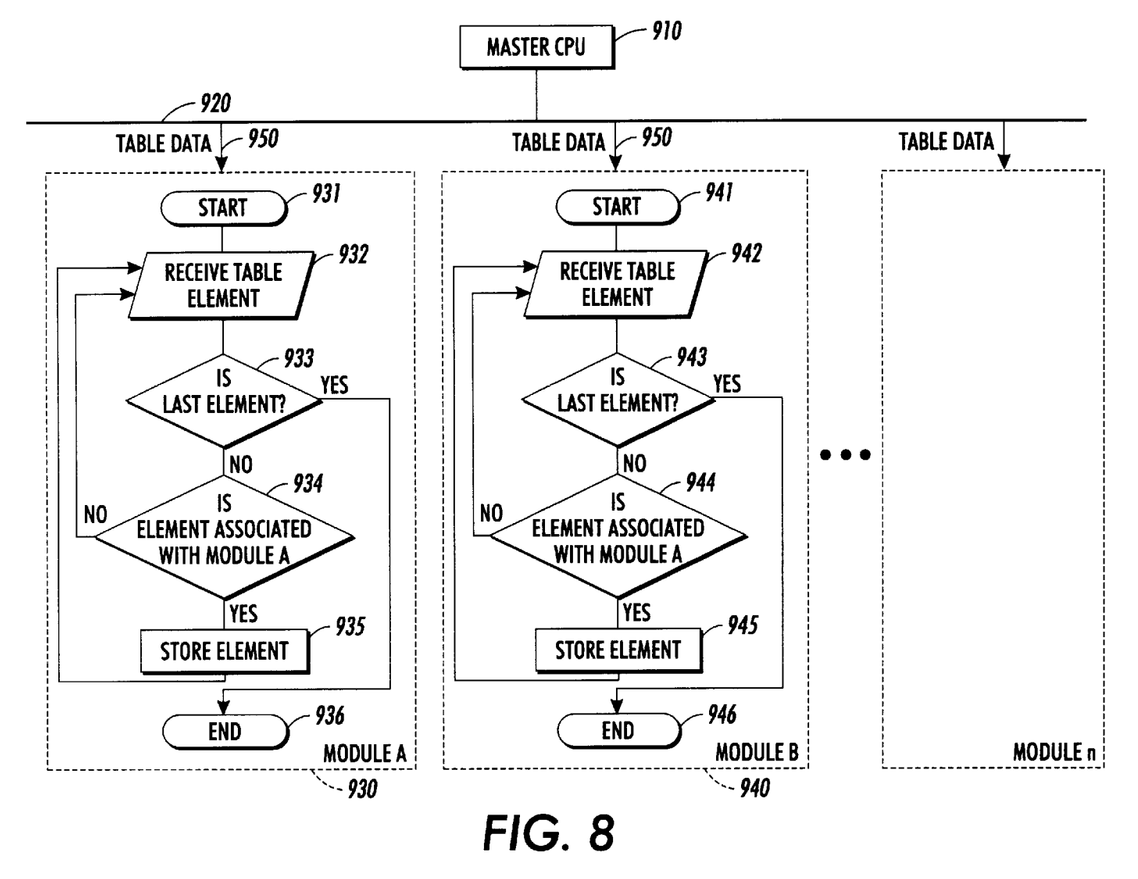
FIG. 8 is a flowchart of the system configured for downloading a program to the network.

Referring now to FIG. 8, there is shown a flowchart for the network download of the control program to the system. The network download may be provided by a master computer 910, which may be a personal computer, a hand held computer, a mobile telephone, another toy module according to the modules disclosed herein, or any other source capable of storing a control program. The master computer 910 communicates the control program to all the individual modules simultaneously through a wired communication bus or a wireless communication bus 920 to modules 930 and 940 through communication links 950. For clarity and simplicity, only two modules 930 and 940 are illustrated; however it is apparent that multiple modules would be interconnected for the system described herein.

Each module individually determines which element or elements of the control program are needed for that module as the control program is streamed over communication bus 920. This may be accomplished by checking for explicit identification labels included in the control program, or possibly through implicit means, such as the physical position of a module or adjacency of the module to other modules. This process is initiated at step 931 in the first module when the control program is received over communication bus 920.

For illustrative purposes, each module could have a label associated with it that could be sent with the information to the network of modules. In this manner each table element explicitly indicates which module corresponds to that element. At step 932 a table element is received and at step 933 a determination is made as to whether the received element is the last element of the table. If it is not the last element, then a determination is made as to whether the element is associated with the first module. If the element is associated with the first module, it is stored at step 935. If the element is not associated with the first module, then control is passed to step 932, where the data is ignored. If an element is determined to be the last element in the table, the download process for the first module ends at step 936. The same process is followed for the second module and every other module connected in the system.

Alternatively, an implicit means may contain symbolic labels for data in a table and each module would determine whether the symbolic labels applied to it. For example, a system configured to have legs may have a table sent with descriptions for modules in the leg positions. The modules would then determine individually whether or not they are in a leg position.

An example of the table described above could be a gait control table. In such a table a sequence of behavior descriptions controls the behavior of each module. In a simple form, such behavior could be an open loop motion of a module, perhaps movement of a leg from a zero degree position to a ten degree position at a specified speed. Alternatively a form of closed loop feedback from a sensor on each module could drive movement from one position to the next in the table. Each module may begin execution at the top of the table and move from one behavior to the next in the table until the end of the table is reached, at which point the cycle starts over.

To program a locomotion gait, a table may be structured specifying angles for each of the joints of the module at a specified elapsed time. The modules interpolate the joint angles during the time between each specified time in the table. For the case of locomotion gaits, the gait is repeating, so only one cycle of the gait needs to be stored as the table for the gait. For the system described herein, the program is distributed among the modules such that each module only stores the portion of the table that corresponds to its own movements. This requires less program memory space for each module, which enables the system to store longer and more complex programs. Additionally, the system becomes scalable with regards to program space. As more modules are added, the program space increases at the same rate that the table increases. If the control program were stored in only one computer, or the entire program for all modules were stored in every module, as modules are added the size of the table or the control program would grow linearly, but the program space would remain unchanged.

For the distributed system with separate modules, each with its own motor and controller, to perform optimally, the controllers must be coordinated. This may be achieved by the system indicating a signal to synchronize the controllers. The signal may be a one-time event such as power being provided to the system, or a button on one module may be pressed, thereby sending a signal to all the other modules. Alternatively, the controller of one of the modules may send a signal under its own program, its own interpretation of its own sensors, or a combination of information obtained from communicating with other modules about the system's state. The signal may also be a continuing regular signal such as the tick of a clock to maintain continual closed loop synchronization, or it may be non-regular, depending on other system events.

While the present invention has been illustrated and described with reference to specific embodiments, further modification and improvements will occur to those skilled in the art. For example, "code" as used herein, or "program" as used herein, is any plurality of binary values or any executable, interpreted or compiled code, which can be used by a computer or execution device to perform a task. This code or program can be written in any one of several known computer languages. A "computer" or "processor", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A method for controlling an assemblage of robotic modules for a toy construction system, each one of said robotic modules including memory capability, an actuator, communication means, and a central processing unit, the method comprising:

distributing a sequence of behaviors for the assemblage of robotic modules among the robotic modules; and storing said sequence of behaviors within the individual central processing units of each of the robotic modules.

2. The method for controlling an assemblage of robotic modules according to claim 1, wherein each one of the robotic modules stores only the sequence of behaviors to be executed by that one robotic module.

3. The method for controlling an assemblage of robotic modules according to claim 1, wherein said sequence of behaviors comprises:

providing an initialization signal to each of said robotic modules in the assemblage of robotic modules;

initiating a first behavior for each of the robotic modules;

discontinuing a first behavior when a first trigger is received for each module; and initiating and discontinuing behavior steps upon receipt of a trigger until all behavior steps have been executed.

4. The method for controlling an assemblage of robotic modules according to claim 3, wherein said trigger comprises an internal state change.

5. The method for controlling an assemblage of robotic modules according to claim 3, wherein said trigger comprises an external state change.

6. A method for downloading a control program to an assemblage of robotic modules for a toy construction system, each one of said robotic modules including memory capability, an actuator, communication means, and a central processing unit, the method comprising:

communicating the control program to all robotic modules simultaneously; and requiring each of the robotic module to determine which elements of the control program are relevant for its individual control.

7. The method for downloading a control program to an assemblage of robotic modules according to claim 6, wherein requiring each said robotic module to determine which elements of the control program are relevant for its individual control comprises checking for identification labels included within the control program.

8. The method for downloading a control program to an assemblage of robotic modules according to claim 6, wherein requiring each said robotic module to determine which elements of the control program are relevant for its individual control comprises identifying the position of said robotic module.

9. The method for downloading a control program to an assemblage of robotic modules according to claim 6, wherein requiring each said robotic module to determine which elements of the control program are relevant for its individual control comprises identifying the position of at least one other robotic module within the assemblage of robotic modules.

* * * * *